United States Patent
Hoffman et al.

(10) Patent No.: US 11,722,081 B1
(45) Date of Patent: Aug. 8, 2023

(54) SYSTEM AND METHOD FOR DETERMINING A CYCLIC DISTURBANCE IN AN INDUSTRIAL CONTROL SYSTEM

(71) Applicant: Rockwell Automation Technologies, Inc., Mayfield Heights, OH (US)

(72) Inventors: Jonathan D. Hoffman, Milwaukee, WI (US); Adam M. Shea, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2 days.

(21) Appl. No.: 17/584,006

(22) Filed: Jan. 25, 2022

(51) Int. Cl.
*H02P 6/22* (2006.01)
*H02P 21/14* (2016.01)
*H02P 6/16* (2016.01)
*H02P 27/06* (2006.01)

(52) U.S. Cl.
CPC ............... *H02P 21/14* (2013.01); *H02P 6/16* (2013.01); *H02P 27/06* (2013.01)

(58) Field of Classification Search
CPC .... H02P 6/22; H02P 6/15; H02P 21/14; H02P 6/16; H02P 27/06
See application file for complete search history.

(56) References Cited

U.S. PATENT DOCUMENTS 6,969,963 B2 * 11/2005 Sakai ............... H02P 6/15
318/803
2020/0358340 A1 * 11/2020 Guru ............... H02P 6/22

OTHER PUBLICATIONS

C. W. Secrest et al.; "Adaptive Decoupling of Non-ideal Machine and Sensor Properties for Extraction of Fine Details When Using the Motor Drive as a Diagnostic Sensor"; IEEE Transactions on Industry Applications; vol. 53, No. 3, pp. 2925-2935; May-Jun. 2017.
C. M. Wolf et al.; "Using the Traction Drive as the Sensor to Evaluate and Track Deterioration in Electrified Vehicle Gearboxes"; IEEE Transactions on Industry Applications, vol. 49, No. 6, pp. 2610-2618, Nov.-Dec. 2013.
K.K. Huh et al.; "Gear Fault Diagnostics Integrated in the Motion Servo Drive for Electromechanical Actuators"; IEEE Transactions on Industry Applications, vol. 48, No. 1, pp. 142-150, Jan.-Feb. 2012.

* cited by examiner

*Primary Examiner* — Cortez M Cook
(74) *Attorney, Agent, or Firm* — Boyle Fredrickson, SC (57) ABSTRACT

A motor drive monitors operation of a motor and adaptively track disturbances experienced by the motor. The motor drive receives a command signal and a cycle position signal. An estimated disturbance observed throughout a cycle of operation is stored in a look up table, and the motor drive uses the stored values as a feedforward value into a control module. The motor drive adaptively monitors operation of the motor and generates a new estimated disturbance value throughout each subsequent cycle of operation. The values of the estimated disturbance are updated within the look up table as a function of the new estimated disturbance values and of the previously stored values. The stored disturbance values adaptively track cyclic disturbances in the controlled machine or process and to reduce the effects of these cyclic disturbances on tracking error in the controlled machine or process.

20 Claims, 7 Drawing Sheets

| Cycle Inc. | Dist Val. |
|---|---|
| 0.000 | 0.00 |
| 0.001 | 0.00 |
| 0.002 | 0.00 |
| 0.446 | 0.11 |
| 0.447 | 0.13 |
| 0.448 | 0.15 |
| 1.000 | 0.000 |

FIG. 11

SYSTEM AND METHOD FOR DETERMINING A CYCLIC DISTURBANCE IN AN INDUSTRIAL CONTROL SYSTEM

BACKGROUND INFORMATION

The subject matter disclosed herein relates to adaptively decoupling a cyclic disturbance in a controlled machine or process. More specifically, a controller provides a reference signal corresponding to a cycle of operation for the controlled machine or process to a motor drive, and the motor drive monitors performance of a motor controlled by the motor drive throughout the cycle of operation to adaptively reduce tracking error as a result of disturbances observed during the cycle of operation.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The rectifier section may be a passive rectifier with diodes converting the AC voltage to a DC voltage, or the rectifier section may be an active front end with power electronic switching devices, such as metal-oxide semiconductor field-effect transistors (MOSFETs), insulated gate bipolar transistors (IGBTs), thyristors, or silicon-controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to convert the AC voltage to a desired DC voltage on the DC bus. An inverter section is supplied between the DC bus and an output of the motor drive to convert the DC voltage on the DC bus back to an AC voltage having a variable amplitude and frequency to control rotation of the motor. The inverter section includes power electronic switching devices and receives switching signals to selectively turn on and off each switching device to obtain the desired AC voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude and/or frequency of the output voltage is varied. The motor controller utilizes modulation techniques such as pulse width modulation (PWM) to control the switching and to synthesize waveforms having the desired amplitudes and frequencies to follow the command signal and obtain desired operation.

However, limits on operation sometimes prevent a motor drive from following the command signal. A difference in the actual trajectory achieved by the motor drive and a trajectory defined by the commanded signal is referred to as tracking error. In many instances, this inability to follow the commanded trajectory is temporary. A motor drive may, for example, receive a position command requiring acceleration beyond the capacity of the motor drive. While attempting to follow the commanded trajectory, the motor drive may output a maximum current it is able to produce and, as a result, obtain a maximum rate of acceleration. This maximum rate of acceleration, however, may not result in the motor following the position command and some tracking error results. After the motor has accelerated to a speed corresponding to the rate of change in the position command and if a maximum speed of operation for the motor drive is not exceeded, the motor drive may continue acceleration and operate for a short duration at a speed greater than the intended speed of operation to resolve the tracking error. Once the motor has eliminated the tracking error, the motor drive returns to the commanded trajectory and continues operating according to the commanded signal.

If a motor drive encounters some level of tracking error for too great a period of time or if the magnitude of the tracking error becomes too great at any given instance in time, the controlled machine or process may no longer achieve desired operation and a fault condition may occur. When tracking error is too great, parts being manufactured, containers being filled, or labels being applied, for example, may generate a part that is out of tolerance, may incorrectly fill a container, of may misapply a label to the product.

Thus, it would be desirable to minimize tracking error in a controlled machine or process.

When generating command trajectories, known operating conditions and operating capabilities of the controlled machine or process are considered in order to generate feasible command trajectories. However, outside influences acting on the controlled machine or process may cause some tracking error. Some such outside influences may be vibration in a gearbox or drive belt, a resonant operating condition, or a physical impact between components in the controlled machine or process.

The ability of the motor drive to follow a trajectory is dependent not only on the configuration of the motor drive but also on the configuration of the load to be driven by the motor. In certain applications, a load may be coupled by a rigid connection and have a fixed inertia. Such a load may result in a predictable response and may be factored into the motion profile generated by the industrial controller. In other applications, the load may be coupled via a flexible coupling, which may introduce resonance and/or backlash into the controlled system. In still other applications, the load may vary during operation and may even vary in an unknown manner. Such variations in the dynamics of the controlled system may result in motion profiles that cannot always be followed by the motor drive. The motor drive will respond according to its maximum response limits, but there could be overshoot, oscillation, or other undesirable performance of the motor.

Thus, it would be desirable to provide a system and method to monitor operation of the motor during operation and adaptively track disturbances experienced by the motor.

It would also be desirable to provide a system and method to decouple the disturbances identified as a result of the adaptive tracking.

BRIEF DESCRIPTION

According to one embodiment of the invention, a method for dynamic observation of a cyclic disturbance in a controlled machine or process includes receiving a command signal and a cycle position signal at a motor drive. The command signal corresponds to a desired operation of a motor operatively controlled by the motor drive, and the cycle position signal corresponds to a location within one cycle of operation of the controlled machine or process, where the cycle of operation does not correspond to one rotation of the motor. A value of an estimated acceleration resulting from a disturbance force experienced by the motor during the cycle of operation is determined and stored in memory of the motor drive at a plurality of sample instances within the cycle of operation.

According to another embodiment of the invention, a motor drive is configured to dynamically observe a cyclic disturbance in a controlled machine or process. The motor drive includes at least one input configured to receive a command signal and a cycle position signal, a memory configured to store a look up table, and a processor. The command signal corresponds to a desired operation of a motor operatively connected to the motor drive and the cycle position signal corresponds to a location within one cycle of operation of the controlled machine or process. The processor is configured to determine a value of an estimated acceleration resulting from a disturbance force experienced by the motor during the cycle of operation and store the value of the estimated acceleration in the look up table at a plurality of sample instances within the cycle of operation.

According to yet another embodiment of the invention, a method for dynamic compensation of a cyclic disturbance in a controlled machine or process includes receiving a command signal and a cycle position signal at a motor drive. The command signal corresponds to a desired operation of a motor operatively controlled by the motor drive and the cycle position signal corresponds to a location within one cycle of operation of the controlled machine or process, where the cycle of operation does not correspond to one rotation of the motor. A disturbance value is read from a look up table stored in a memory of the motor drive, where the disturbance value corresponds to the cycle position signal. A control module is executed within the motor drive responsive to receiving the command signal to obtain the desired operation of the motor, and the disturbance value is provided to the control module to reduce a tracking error in the control module.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method to monitor operation of the motor during operation and adaptively track disturbances experienced by the motor. The motor drive receives a command signal and a cycle position signal. During an initial run through one cycle of operation, the motor drive monitors operation of the motor and generates an estimated disturbance throughout the cycle of operation. Values of the estimated disturbance are stored in a look up table at periodic intervals within the cycle of operation. During subsequent runs through the cycle of operation, the motor drive uses stored values of disturbance from a prior run as a feedforward value into a control module. The motor drive again monitors operation of the motor and generates a new estimated disturbance value throughout each subsequent cycle of operation. The values of the estimated disturbance are updated within the look up table as a function of the new estimated disturbance values and of the previously stored values. The values of estimated disturbance throughout one cycle of operation are continually calculated throughout subsequent cycles to reduce the effects of periodic disturbance observed by the motor drive within a cycle of operation by the controlled machine or process. The stored disturbance values adaptively track cyclic disturbances in the controlled machine or process and reduce the effects of these cyclic disturbances on tracking error in the controlled machine or process.

Figure 1:
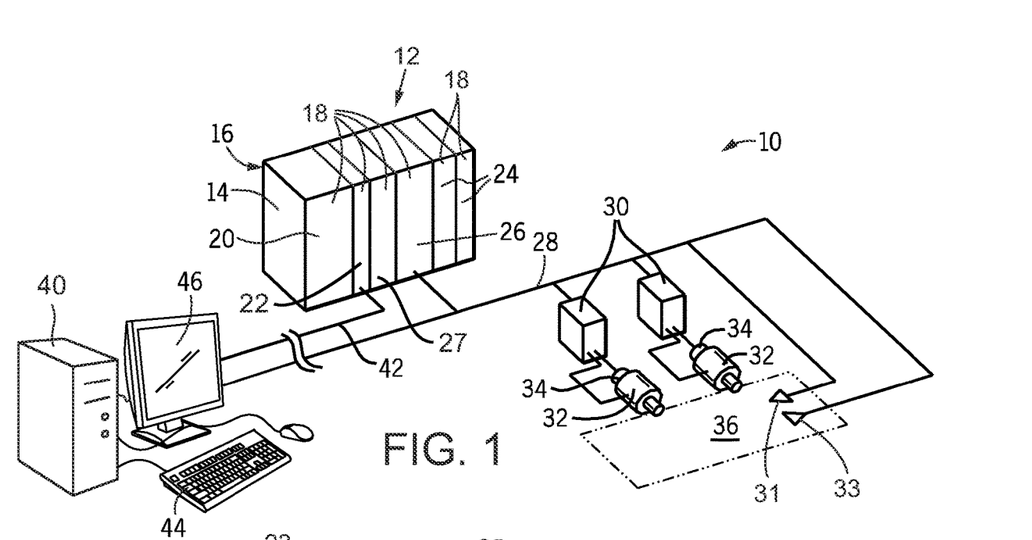
FIG. 1 is an exemplary industrial control system in which embodiments of the present invention are incorporated.

Referring initially to FIG. 1, an industrial control system 10 may include an industrial controller 12 providing multiple modules 18 and a bus 16 providing communication between the multiple modules 18. The modules 18 may be installed within a housing or on a mounting bracket, such as a DIN rail. The bus 16 is typically a backplane coupled between modules 18 via suitable connectors. The modules may include, for example, a power supply module 20, a processor module 22, one or more I/O modules 24, a motion control module 27, and a network module 26. The network module 26, processor module 22, or a combination thereof may communicate on an industrial control network 28, such as ControlNet®, DeviceNet®, or EtherNet/IP®, between the industrial controller 12 and other devices connected to the industrial controller. The industrial controller 12 may be, for example, a programmable logic controller (PLC), a programmable automation controller (PAC), or the like. It is contemplated that the industrial controller 12 may include still other modules, such as an axis control module, or additional racks connected via the industrial control network 28. Optionally, the industrial controller 12 may have a fixed configuration, for example, with a predefined number of network and I/O connections.

The industrial control network 28 may join the industrial controller 12 to remote I/O modules (not shown) and one or more remote motor drives 30, the latter of which may communicate with corresponding electric motors 32 and position sensors 34 to provide for controlled motion of the electric motors 32. The controlled motion of the electric motors, in turn, controls associated industrial machinery or processes 36. While a single motor drive and motor may be referred to as an axis of motion, an axis of motion may also require multiple motors controlled by a single motor drive or multiple motor drives and multiple motors operating in tandem. The network 28 may also join with other devices 31, 33 in the controlled machine or process 36, including, for example, actuators 31, controlled by output signals from the industrial controller 12, or sensors 33, providing input signals to the industrial controller.

A configuration computer 40 may communicate with the industrial controller 12 and/or the motor drives 30 over the industrial control network 28 or via a dedicated communication channel 42, for example, connecting with the processor module 22. The configuration computer 40 may be a standard desktop or laptop computer and include a keyboard 44, display screen 46, and the like to permit the entry and display of data and the operation of a configuration program by a human operator.

Figure 2:
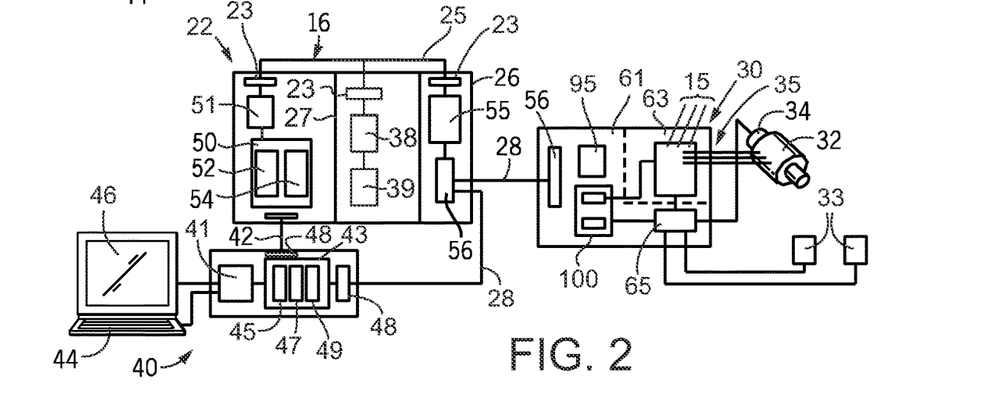
FIG. 2 is a partial block diagram representation of the exemplary industrial control system of FIG. 1

Referring next to FIG. 2, the processor module 22 includes a processor 51 communicating with a memory device 50 to execute an operating system program 52, generally controlling the operation of the processor module 22, and a control program 54, describing a desired control of the industrial machine or process 36, where each control program 54 is typically unique to a given application of the industrial control system 10. The memory 50 may also include data tables, for example, I/O tables and service routines (not shown in FIG. 2) as used by the control program 54.

The processor module 22 communicates via the bus 16, illustrated as a backplane 25 extending between backplane connectors 23, with the network module 26 or any of the other modules 18 in the industrial controller 12. The network module 26 includes a control circuit 55, which may include a microprocessor and a program stored in memory and/or dedicated control circuitry such as an application specific integrated circuit (ASIC) or field programmable gate array (FPGA). The control circuit 55 may communicate with a network interface circuit 56 within the network module 26, where the network interface circuit 56 provides for execution of low-level electrical protocols on the industrial control network 28. Similar network interface circuits 56 may be provided on other devices, such as the motor drives 30, to provide communication between devices.

According to the illustrated embodiment, a motion control module 27 determines motion profiles for one or more of the motors 32 to follow. The motion profile may include a position reference signal ($\theta^*$), a velocity reference signal ($\omega^*$), an acceleration reference signal ($\alpha^*$), or a combination thereof to define the desired motion profile. The motion control module 27 includes a processor 38 in communication with a memory device 39 to execute one or more motion profile generators. It is contemplated that the motion control module 27 may execute a separate motion profile generator for each axis of motion. The reference signal, or signals, are transmitted from the motion control module 27 via the backplane 25 to the network module 26 and then via the industrial control network 28 to each motor drive. In some embodiments of the invention, it is contemplated that the processor module 22 may be configured to generate the motion profile for each axis and, in turn, generate the position reference signal ($\theta^*$), the velocity reference signal ($\omega^*$), the acceleration reference signal ($\alpha^*$), or a combination thereof.

In addition to a motion profile, the motion control module 27 or the processor module 22 is configured to generate a cycle position reference signal 99. The cycle position reference signal 99 denotes at what point within a cyclical process the controlled machine or process is operating. According to one aspect of the invention, the cycle position reference signal 99 may be a value between zero and one or a value between zero and one hundred percent. The cycle position reference signal 99 is incrementally changed between zero and one as the controlled machine or process executes one cycle. When a cycle is complete, the cycle position reference signal 99 returns to zero. This example is not intended to be limiting. The cycle position reference signal 99 may be defined between any suitable range of values according to the application requirements, where each value provides an indication of a repeated point within the cycle. According to the illustrated embodiment, the cycle position reference signal 99 is transmitted via the industrial control network 28 to the motor drive 30. Optionally, the cycle position reference signal 99 may be transmitted via a dedicated output signal or via a separate communication bus to the motor drive.

As noted above, the configuration computer 40 may be a standard desktop computer having a processor 41 communicating with a memory 43, the latter holding an operating system program 45 as well as various data structures 47 and programs 49. One such program 49 may be used to configure the industrial control system 10. The configuration computer 40 may also provide for interface circuits 48 communicating between the processor 41, for example, and the industrial network 28 or a separate communication channel 42 to the processor module 22, as well as with the screen 46 and keyboard 44 according to methods understood in the art.

Figure 3:
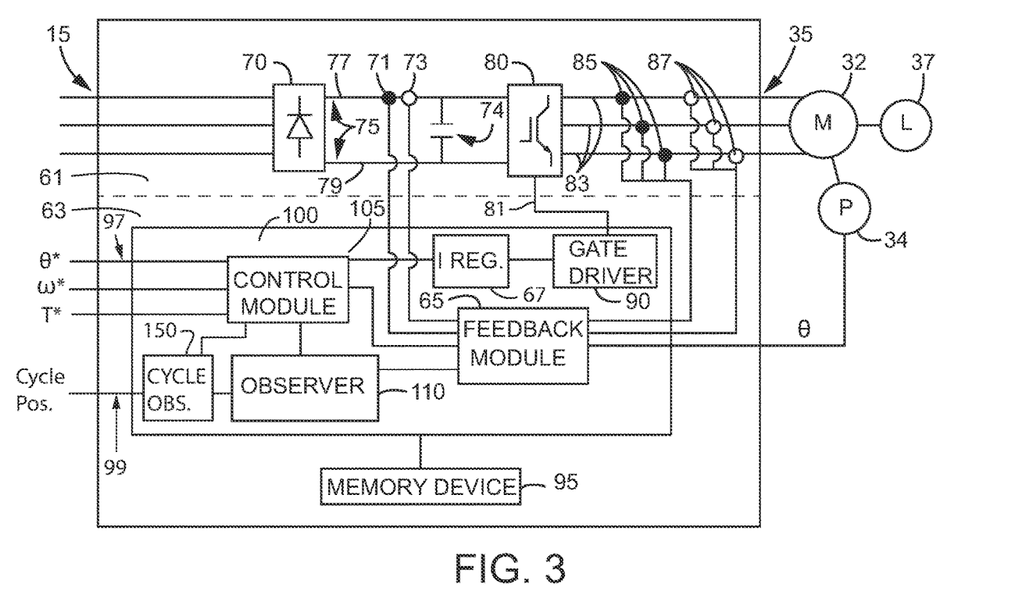
FIG. 3 is a block diagram representation of the motor drive of FIG. 1 incorporating one embodiment of the present invention.

Turning next to FIG. 3, a motor drive 30, according to one embodiment of the invention, includes a power section 61 and a control section 63. The power section 61 includes components typically handling, for example, 200-575 VAC or 200-800 VDC. The power section 61 receives power in one form and utilizes power switching devices to regulate power output to the motor 32 in a controlled manner to achieve desired operation of the motor 32. The control section 63 includes components typically handling, for example 110 VAC or 3.3-50 VDC. The control section 63 includes processing devices, feedback circuits, and supporting logic circuits to receive feedback signals and generate control signals within the motor drive 30.

Figure 4:
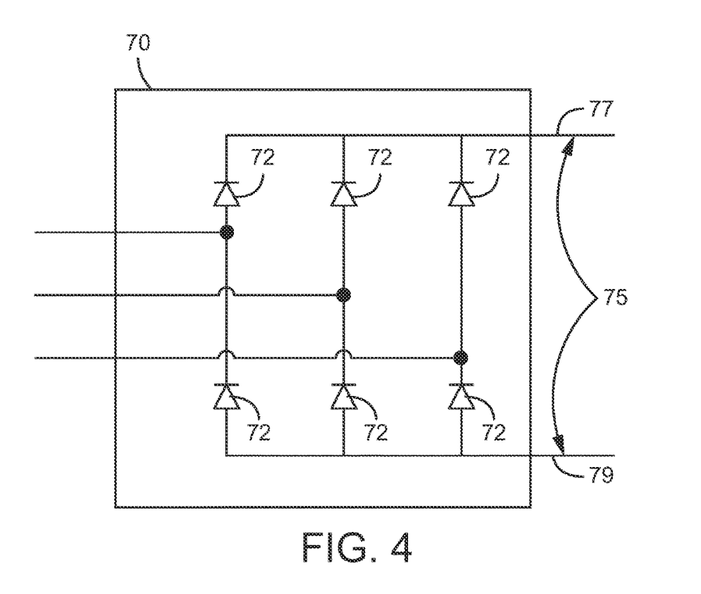
FIG. 4 is a block diagram representation of a rectifier section from the motor drive of FIG. 3.

According to the illustrated embodiment, the motor drive 30 is configured to receive a three-phase AC voltage at an input 15 of the motor drive 30 which is, in turn, provided to a rectifier section 70 of the motor drive 30. The rectifier section 70 may include any electronic device suitable for passive or active rectification as is understood in the art. With reference also to FIG. 4, the illustrated rectifier section 70 includes a set of diodes 72 forming a diode bridge that rectifies the three-phase AC voltage to a DC voltage on the DC bus 75. Optionally, the rectifier section 70 may include other solid-state devices including, but not limited to, thyristors, silicon-controlled rectifiers (SCRs), or transistors to convert the input power 15 to a DC voltage for the DC bus 75. The DC voltage is present between a positive rail 77 and a negative rail 79 of the DC bus 75. A DC bus capacitor 74 is connected between the positive and negative rails, 77 and 79, to reduce the magnitude of the ripple voltage resulting from converting the AC voltage to a DC voltage. It is understood that the DC bus capacitor 74 may be a single capacitor or multiple capacitors connected in parallel, in series, or a combination thereof. The magnitude of the DC voltage between the negative and positive rails, 79 and 77, is generally equal to the magnitude of the peak of the AC input voltage.

Figure 5:
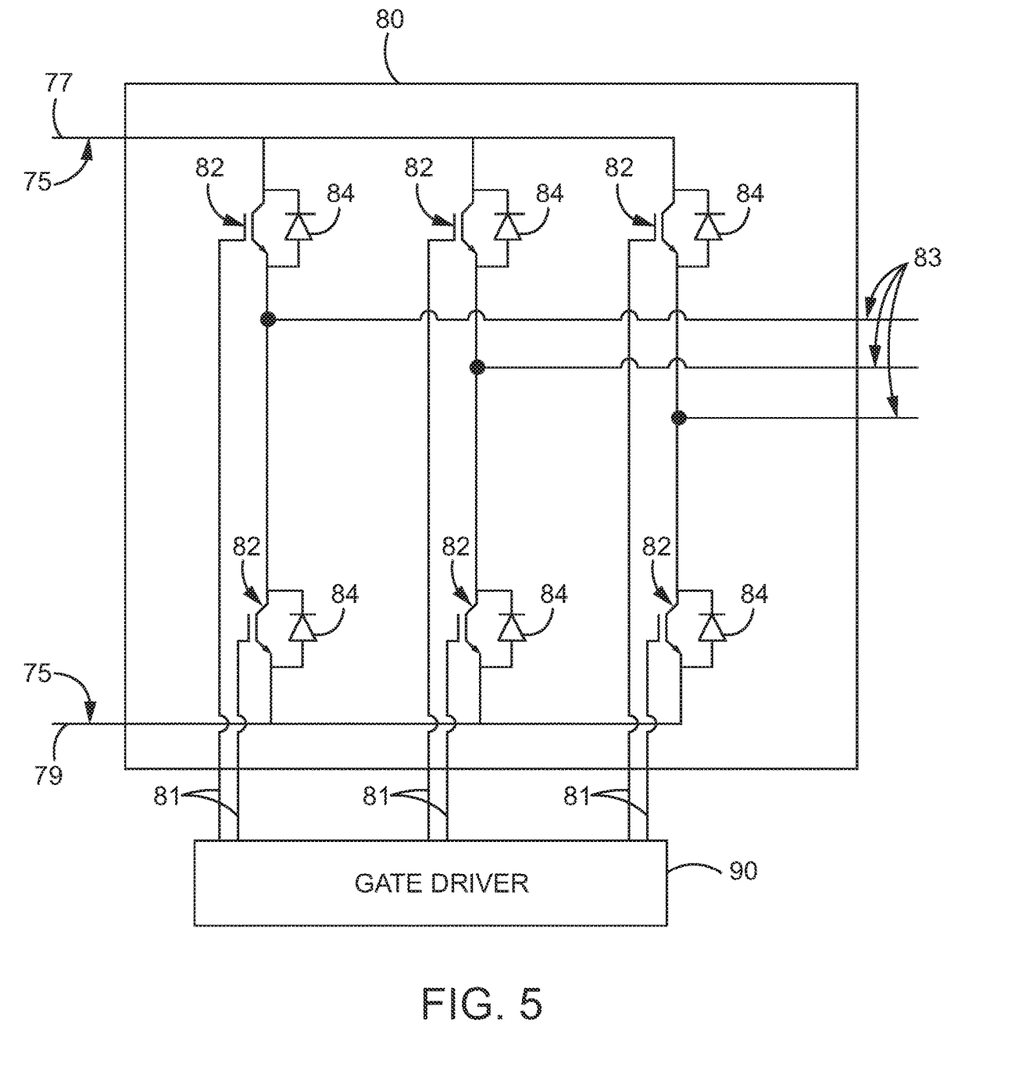
FIG. 5 is a block diagram representation of an inverter section and gate driver module from the motor drive of FIG. 3.

The DC bus 75 is connected in series between the rectifier section 70 and an inverter section 80. Referring also to FIG. 5, the inverter section 80 consists of switching elements, such as transistors, thyristors, or SCRs as is known in the art. The illustrated inverter section 80 includes an insulated gate bipolar transistor (IGBT) 82 and a free-wheeling diode 84 connected in pairs between the positive rail 77 and each phase of the output voltage as well as between the negative rail 79 and each phase of the output voltage. Each of the IGBTs 82 receives gating signals 81 to selectively enable the transistors 82 and to convert the DC voltage from the DC bus 75 into a controlled three phase output voltage to the motor 32. When enabled, each transistor 82 connects the respective rail 77, 79 of the DC bus 75 to an electrical conductor 83 connected between the transistor 82 and the output terminal 35. The electrical conductor 83 is selected according to the application requirements (e.g., the rating of the motor drive 30) and may be, for example, a conductive surface on a circuit board to which the transistors 82 are mounted or a bus bar connected to a terminal from a power module in which the transistors 82 are contained. The output terminals 35 of the motor drive 30 may be connected to the motor 32 via a cable including electrical conductors connected to each of the output terminals 35.

One or more modules are used to control operation of the motor drive 30. According to the embodiment illustrated in FIG. 3, a controller 100 includes the modules and manages execution of the modules. The illustrated embodiment is not intended to be limiting and it is understood that various features of each module discussed below may be executed by another module and/or various combinations of other modules may be included in the controller 100 without deviating from the scope of the invention. The modules may be stored programs executed on one or more processors, logic circuits, or a combination thereof. The controller 100 may be implemented, for example, in a microprocessor, application specific integrated circuit (ASIC), field programmable gate array (FPGA), or other such customizable device. The motor drive 30 also includes a memory device 95 in communication with the controller 100. The memory device 95 may include transitory memory, non-transitory memory, persistent memory, or non-persistent memory, or a combination thereof. The memory device 95 is configured to store data and programs, which include a series of instructions executable by the controller 100. The memory device 95 may be a single device, multiple devices, or incorporated, for example, as a portion of another device such as an application specific integrated circuit (ASIC). The controller 100 is in communication with the memory 95 to read the instructions and data as required to control operation of the motor drive 30.

The controller 100 receives a reference signal 97 identifying desired operation of the motor 32 connected to the motor drive 30. The reference signal 97 may be, for example, a position reference ($\theta^*$), a speed reference ($\omega^*$), a torque reference ($T^*$), or a combination thereof. Although all three reference signals are illustrated in FIG. 3, commonly one of the three input signals is selected and provided to the motor drive 30. For a high-performance servo control system, the reference signal 97 is commonly a position reference signal ($\theta^*$). In addition, the controller 100 receives the cycle position reference signal 99. The cycle position reference signal 99 provides an indication of a time, position, duration, or the like at which the controlled machine is presently operating within a repeated cycle. Although illustrated as separate input signals, the reference signal 97 and the cycle position signal 99 may be transmitted in a single data packet over the industrial network 28. The reference signal 97 and the cycle position signal 99 may be transmitted at either the same or different periodic intervals according to the application requirements.

The cycle position reference signal 99 may be transmitted at a lower rate than the reference signal 97 for the motion profile. Further, the cycle position reference signal may be generated at discrete intervals and the motor drive 30 may be configured to interpolate between new values of the cycle position reference signal. For example, a cycle may take five seconds to complete. In many applications, the length of a cycle is fixed and repeatable. Therefore, the cycle position reference signal may not require frequent updating. The cycle position reference signal may be updated and a new value of the cycle position reference signal transmitted at a rate of ten times per second. The motor drive, however, may execute its control routines in a range of one thousand to ten thousand times per second. The motor drive receives the updated position reference signal 99 at the ten intervals per second and may interpolate one hundred to one thousand divisions of the cycle position reference signal between each new value received as a function of the frequency at which the control routine is being executed. As will be described in more detail below, the look up table 154 (see also FIG. 11) may include increments of the cycle position corresponding to the frequency at which the control routine is being executed.

The controller 100 receives feedback signals indicating the current operation of the motor drive 30. According to the illustrated embodiment, the controller 100 includes a feedback module 65 that may include, but is not limited to, analog to digital (A/D) converters, buffers, amplifiers, and any other components that would be necessary to convert a feedback signal in a first format to a signal in a second format suitable for use by the controller 100 as would be understood in the art The motor drive 30 may include a voltage sensor 71 and/or a current sensor 73 on the DC bus 75 generating a feedback signal corresponding to the magnitude of voltage and/or current present on the DC bus 75. The motor drive 30 may also include one or more voltage sensors 85 and/or current sensors 87 on the output phase(s) of the inverter section 80 generating a feedback signal corresponding to the magnitude of voltage and/or current present on the electrical conductors 83 between the inverter section 80 and the output 85 of the motor drive. A position feedback device 34 may be connected to the motor 32 and operable to generate a position feedback signal, θ, corresponding to the angular position of the motor 32. The motor drive 30 includes an input configured to receive the position feedback signal from the position feedback device 34. It is contemplated that the input may configured to receive a sinusoidal feedback signal, a square wave, a digital pulse train, a serial communication data packet, or a combination thereof according to the configuration of the position feedback device 34.

The controller 100 utilizes the feedback signals and the reference signals 97, 99 to control operation of the inverter section 80 to generate an output voltage having a desired magnitude and frequency for the motor 32. The feedback signals are processed by the feedback module 65 and converted, as necessary, to signals for the control module 105.

Figure 6:
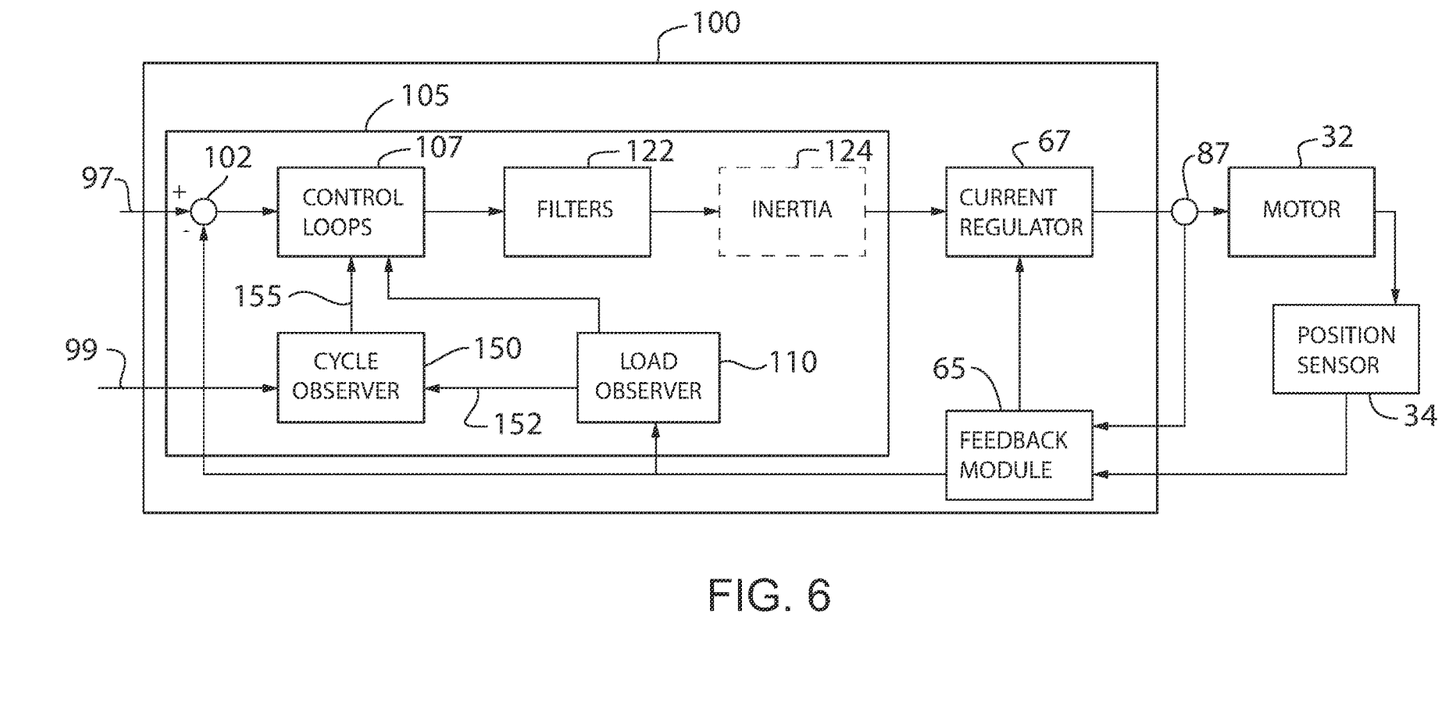
FIG. 6 is a block diagram representation of a controller for the motor drive of FIG. 1.

With reference also to FIG. 6, the control module 105 includes control loops 107 and filters 122, as will be discussed in more detail below, to receive the command signal 97 and a feedback signal, such as a position feedback signal, and execute responsive to the command signal 97 and the feedback signals to generate a desired reference signal. The control module 105 also includes a load observer 110 to generate an estimated response of one or more operating characteristics of the motor 32. The estimated response may be added to the reference signal from the control loops 107 to generate a modified reference signal. An estimated response may also be provided to a cycle observer 150. The cycle observer 150 receives the cycle position reference signal 99 and an estimated acceleration 152 from the load observer 110 as inputs and generates a cyclical disturbance acceleration feed forward signal 155 as an output. As will be discussed in more detail below, the cycle observer 150 provides an estimate of cyclical disturbances experienced by the controlled machine or process to the control loops 107. One or more filters 122 may be present in the control module 105 to reduce or eliminate undesired components of the modified reference signal. The output of the filter block 122 is a filtered reference signal. As shown in FIG. 6, an optional inertia block 124 may be included in-line with the filters 122. As will be discussed in more detail below, the inertial gain may be included in the inertia block 124 or, optionally, may be incorporated into gains within the control loops 107. The filtered reference signal is provided to the inertia block which outputs a torque reference signal. The torque reference signal is, in turn, output to the current regulator 67. As is understood in the art, the current regulator 67 may independently regulate a torque producing component of the current and a flux producing component of the current. The torque reference signal is provided as an input to the regulator controlling the torque producing component of the current. The current regulator 67 uses the torque reference signal and a current feedback signal to output a voltage signal to a gate driver module 90. The gate driver module 90 generates the gating signals 81, for example, by pulse width modulation (PWM) or by other modulation techniques. The gating signals 81 subsequently enable/disable the transistors 82 to provide the desired output voltage to the motor 32, which, in turn, results in the desired operation of the mechanical load 37 coupled to the motor 32. As is understood in the art, the current regulator 67 is configured to execute at a bandwidth sufficiently greater than the bandwidth of the control module 105 such that the current regulator 67 may be approximated as a unity gain to the control module 105.

Figures 7, 8:
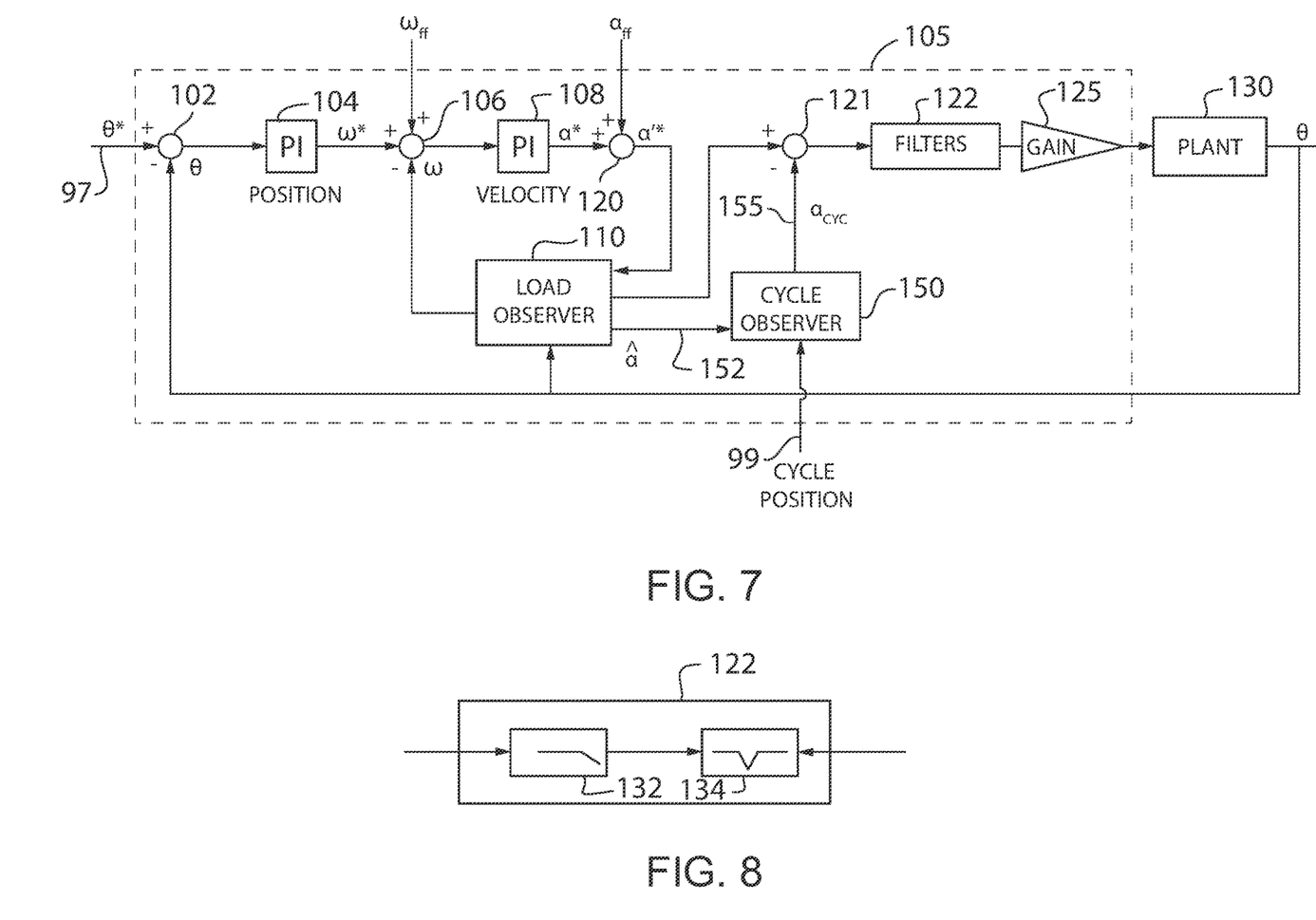
FIG. 7 is a block diagram representation of one embodiment of a control module for the controller of FIG. 6.
FIG. 8 is a block diagram representation of the filter section from the control module of FIG. 7.

Referring next to FIG. 7, a control module 105 according to one embodiment of the invention is illustrated. The control module 105 receives a position command signal (θ*) 97 as an input. The position command signal (θ*) 97 is compared to a position feedback signal (θ) at a first summing junction 102. A position error signal is output from the first summing junction 102 and input to a position loop controller 104. According to the illustrated embodiment, the position loop controller 104 includes a proportional and an integral (PI) controller. Optionally, the position loop controller 104 may be just a proportional (P) controller or further include a derivative (D) controller. Each of the proportional (P), integral (I), and/or derivative (D) controllers of the position loop controller 104 includes a controller gain value. The controller gain values are commonly referred to as a proportional gain (Kpp), integral gain (Kpi), and a derivative gain (Kpd). The output of the position loop controller 104 is a velocity reference signal (ω*).

The velocity reference signal (ω*) is compared to a velocity feedback signal (ω) at a second summing junction 106. The velocity feedback signal (ω) is generated by a load observer 110. Optionally, the velocity feedback signal (ω) may be determined by taking a derivative of the position feedback signal (θ). A velocity error signal is output from the second summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The output of the velocity loop controller 108 is an acceleration reference signal (α*).

The control module 105 may also include feed forward branches. According to the illustrated embodiment, the control module 105 includes feed forward branches for both the velocity and the acceleration elements. A velocity feed forward signal ($ω_{FF}$) is added to the velocity reference signal and the velocity feedback signal at summing junction 106, and an acceleration feedforward signal ($α_{FF}$) is added to the acceleration reference signal at a third summing junction 120. The output of the third summing junction 120 is a modified acceleration reference signal (α*').

The controller further includes a load observer 110. The output of the third summing junction 120 is illustrated as being provided to the load observer 110. According to one embodiment of the controller 100, the load observer 110 determines an estimated acceleration disturbance ($\hat{α}$) 152 as a function of the modified acceleration reference signal (α*') and position feedback signals (θ). This estimated acceleration disturbance may be added to the modified acceleration reference signal (α*') and provided to a fourth summing junction 121. Optionally, the modified acceleration reference signal (α*') may be used internally by the load observer 110, and the modified acceleration reference signal (α*') may be provided directly to the fourth summing junction 121 without modification by the load observer 110.

The output of the fourth summing junction 121 is provided as an input to a filter section 122. The filter section 122 may include one or more filters to remove unwanted components from the control system. Referring also to FIG. 8, the illustrated filter section 122 includes a low pass filter 132 to attenuate undesirable high frequency components and a notch filter 134 to attenuate specific frequency components having an undesirable effect on the controlled mechanical load 37. It is further contemplated that additional filters may be included in the filter section 122 without deviating from the scope of the invention.

According to the embodiment illustrated in FIG. 7, the output of the filter section 122 is provided to a gain block 125. The gain block 125 includes the inertia scaling block 124 shown in FIG. 6 and further includes a torque constant, $K_T$. The inverse of the torque constant, $K_T$, is used to convert a torque reference to a current reference, which is, in turn, provided to the current regulator 67 as seen in FIG. 6. The inertia scaling block 124 applies a gain corresponding to the inertia of the controlled system. The gain of the inertia scaling block 124 is typically referred to simply as an inertia, J. The inertial gain may include a motor inertia value, $J_m$, a load inertia value, Ji, or a combination thereof. While a motor inertia value may be known, or provided by a motor manufacturer, it may be difficult to accurately identify a load inertia value. The load observer 110 may compensate for inertial gains that either do not include a load inertia or do not accurately represent the load inertia.

As indicated above, the output of the control module 105 is provided to a current regulator 67 and gate driver module 90 to output a desired voltage to the motor 32. The plant 130 shown in FIG. 7 represents components of the motor 32 and motor drive 30 external to the control module 105 and may incorporate the current regulator 67, gate module 60, and the inverter section 80 of the motor drive 30, the motor 32, a mechanical load 37, and a position feedback device 34. The position feedback device 34 generates the position feedback signal (θ) used by the control module 105.

Although the reference signal from the third summing junction 120 is illustrated as an acceleration reference, a*, in FIG. 7, in other embodiments, the output of the third summing junction may be a torque reference signal, T*. The inertial value from the gain block 125 may be incorporated into the controller gains. As is understood in the art, angular acceleration is proportional to torque and, more specifically, torque is equal to inertia times the angular acceleration. As a result, incorporating the inertia gain into the controller gains generates a torque reference signal rather than an acceleration reference signal. The acceleration feedforward and an estimated acceleration from the load observer 110 may similarly be converted to torque values by multiplying by the inertia value. The feedforward signal will then be a torque feedforward, $T_{FF}$, and the estimated response generated by the load observer 110 is an estimated torque, $\hat{T}$, applied to the motor shaft as a result of the load on the motor 32. Because the inertial gains have been incorporated with the controller gains, the gain block 125 shown in FIG. 7 would simply include an inverse value of the torque constant, $K_T$.

According to still another embodiment of the invention, it is contemplated that the calculations for the control module 105 may be performed in a per unit system. A per unit system employs scaling factors to convert values in physical units to values in a percentage, or per unit value, where the expected operational range for the value is converted to a value between zero and one or between zero and one hundred percent. Depending on the per unit system, a range of zero to one hundred percent acceleration may be equivalent to a range of zero to one hundred percent torque. As a result, a per unit value of acceleration would be equivalent to a per unit value of torque. Each reference signal and the filtered reference signal in the per unit system would be a unitless reference signal.

In operation, the present invention provides a system to monitor and adaptively decouple cyclical disturbances in the controlled machine or process 36. Certain applications are executed in a cyclical manner. For example, a product may be traveling along a continuous drive member, such as a conveyor belt, or on a pallet which is, in turn, being driven along a processing path. Auxiliary equipment adjacent to the processing path may be configured to stamp or bend the product, apply a label to the product, print text or graphics on the product, or a combination thereof. The auxiliary equipment may include a drive motor 32 configured to move the equipment in a first direction to engage the product and then in a reverse direction to disengage the product. The auxiliary equipment is operated in a cyclical manner for each product passing by the equipment.

The cycle of operation for the auxiliary equipment typically does not correspond to a rotation of the drive motor 32. Motion toward and away from the product may require only a partial turn of the motor or may require multiple turns of the motor. Further, each cycle of operation includes motion in one direction and motion in an opposite direction with potential stops at either end of travel. Thus, there is no correspondence between a cycle of operation for the auxiliary equipment and a position feedback signal generated by an encoder 34 mounted to the motor 32.

Throughout each cycle of operation, a number of disturbance forces may be experienced by the motor 32. The motor 32 may experience an initial disturbance force, for example, when overcoming static friction or as a result of windup in a gearbox during the start of the cycle. When the auxiliary equipment impacts the product for a stamping or folding operation or to adhere a label to the product, the motor 32 experiences a sudden change in torque. During a reversal of direction, the motor 32 may experience some instability or resonance in a mechanical coupling near, or transitioning through, zero speed. All of these disturbance forces may vary slightly over time due, for example, to variations in position of a product as it passes the equipment or from variations in ambient operating conditions. However, within each cycle, the disturbance forces are generally repeated and of similar amplitude for each cycle of operation. The disturbances may additionally create some tracking error within the motor drive 30 when they occur.

Although the controller 100 is configured to bring the tracking error back to zero, the cycle observer 150 monitors performance of the motor 32 and of the motor drive 30 throughout each cycle of operation to identify the disturbances experienced through one cycle of operation. With reference again to FIG. 7, the illustrated load observer 110 determines an estimated acceleration disturbance ($\hat{\alpha}$) 152. The estimated acceleration ($\hat{\alpha}$) 152 is a function of external disturbance forces experienced by the motor. This estimated acceleration ($\hat{\alpha}$) signal 152 and the cycle position signal 99 are provided to the cycle observer 150. The cycle observer 150 stores the estimated acceleration ($\hat{\alpha}$) signal 152 received throughout one cycle of operation in a look up table and provides the value as a feedforward signal to the controller 100 to minimize tracking error resulting from cyclical operation of the controlled machine or process 36.

Figure 11:
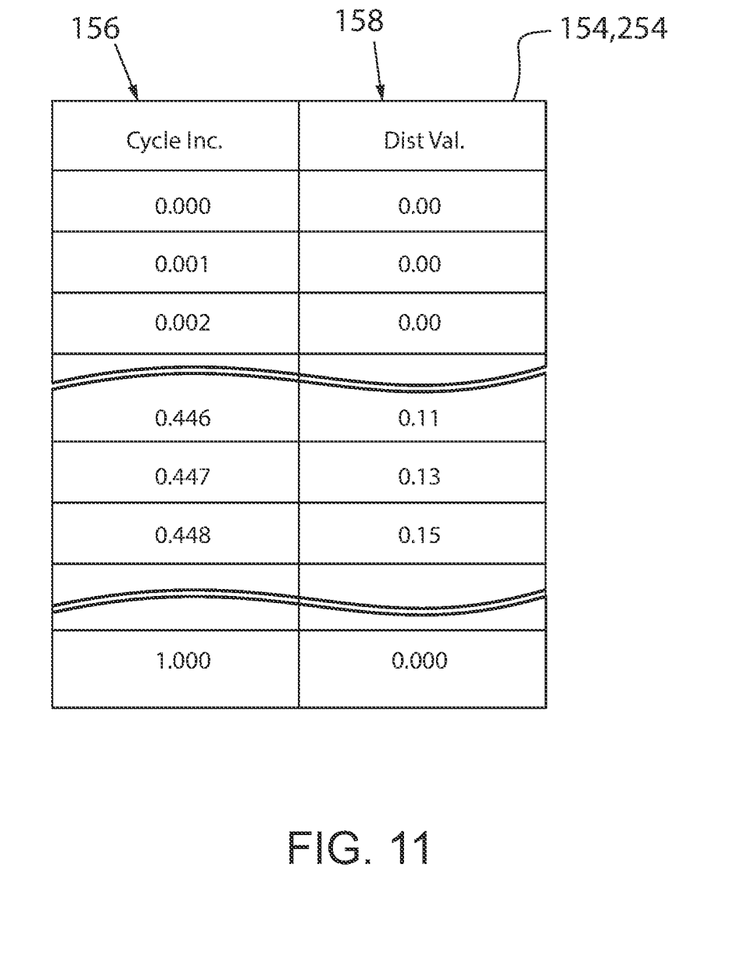
FIG. 11 is a tabular representation of data stored in a look up table utilized according to one embodiment of the present invention.

During an initial run through one cycle of operation, the cycle observer 150 generates a look up table (LUT) 154 (see also FIGS. 9 and 11) corresponding to the estimated acceleration observed throughout the cycle of operation. The cycle position signal 99 is generated at multiple sample instances throughout one cycle of operation. According to the illustrated embodiment, the cycle is divided into one thousand sample instances. The cycle position signal 99 is a value between zero and one, where zero corresponds to a start of the cycle and one corresponds to the end of the cycle. Each sample instance is incremented by one one-thousandth (0.001). The LUT 154 includes an identifier for the increment 156 within the cycle and a value of the disturbance 158 determined by the load observer 110 at that sample instance. The LUT 154 is filled for each sample instance over one cycle of operation. The LUT 154 shown in FIG. 11 is exemplary and is not intended to be limiting. The look up table may store just disturbance values 158 having a known number of sample instances and have a fixed length. Similarly, the LUT 154 may include any number of sample instances. The number of sample instances may vary as a function of the length of time for one cycle of operation to occur or the desired resolution of the observed disturbances.

In some applications, the control module 105 may execute at a frequency greater than the resolution of the look up table. Thus, the position within the cycle changes at a greater rate, but smaller increment during each loop through the control module 105 than data stored in the look up table 154. The control module 105 may utilize a disturbance value 158 at an increment 156 of the look up table 154 closest in position within the cycle to the present position as determined in the control module 105. Alternately, the control module 105 may be configured to interpolate between two adjacent values 158 within the look up table 154.

Figure 9:
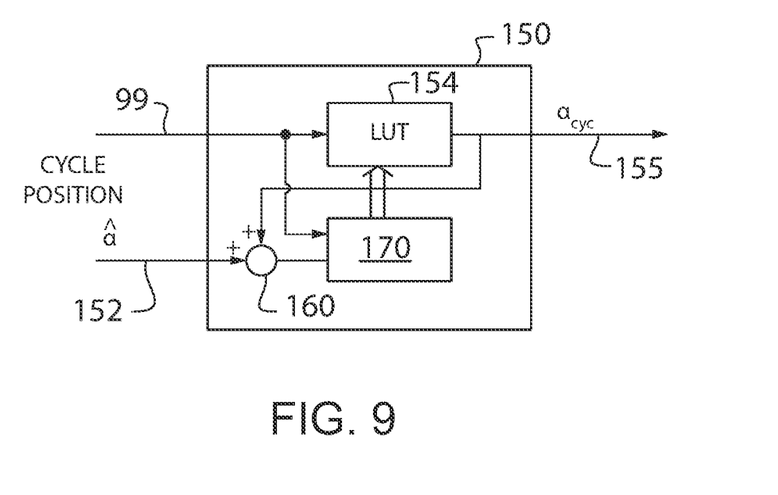
FIG. 9 is a block diagram representation of one embodiment of a cycle observer as implemented in the motor drive of FIG. 3.

After an initial cycle of operation, the cycle observer 150 generates an acceleration feedforward value for use in the control module 105. This acceleration feedforward value is shown as a cyclical acceleration feedforward ($\alpha_{cyc}$) signal 155 output from the cycle observer 150. After the initial cycle of operation, the cyclical acceleration feedforward ($\alpha_{cyc}$) signal 155 corresponds to the values of the estimated acceleration ($\hat{\alpha}$) signal 152 generated during the initial run through one cycle of operation. During subsequent runs through the cycle of operation, the LUT 154 is continually updated by a cyclical disturbance filter routine.

With reference to FIG. 9, a cyclical disturbance filter routine 170 is executing within the cycle observer 150 of the motor drive 30. The cyclical acceleration feedforward ($\alpha_{cyc}$) signal 155 previously stored in the LUT 154 is added to a new estimated acceleration ($\hat{\alpha}$) 152 determined by the load observer 110 at a summing junction 160. This sum as well as the cycle position signal 99 are provided as inputs to the cyclical disturbance filter routine 170. The cyclical disturbance filter routine 170 may take a number of different forms. Two exemplary cyclical disturbance filter routines 170 are presented below in equations 1 and 2.

A simple averaging filter may take the form of equation 1. If a direct average is desired, the weighting value, w, may be set to one. With the weighting value set to one, the previously stored value and the new estimated acceleration are added together and divided by two. Optionally, the filtered value may be given a greater weighting value, such that historical data has a greater weight and that a new estimated acceleration value, which may include a temporary disturbance that is substantially different than the historical cyclical disturbance, does not disproportionately impact the cyclical disturbance value.

$$D(n)=[D(n-1)\cdot w+A(n)]/(w+1) \quad (1)$$

where:
D(n)=new value of estimated acceleration for look up table;
D(n−1)=prior value of estimated acceleration from look up table;
A(n)=new estimated acceleration from load observer; and
w=weighting value.

With reference to equation 1 above, the weighting value is preferably set to a value greater than one. In this manner, the historical data has a greater influence on the new value to be stored in the look up table than a single estimated acceleration value received from the observer 110. As the value of the weighting value increases, the bandwidth of the filter decreases and the cyclical disturbance filter routine 170 will take an increased number of runs through the cycle to filter out cyclical disturbances more completely. However, once the cyclical disturbance filter routine 170 has accurately identified the cyclical disturbances, an increased weighting value will make the filter less susceptible to one-time disturbances that are detected by the load observer 110 and which are not part of the cyclical operation.

A more complex cyclical disturbance filter 170 is shown in equation 2. Each new value of the cyclical acceleration feedforward ($\alpha_{cyc}$) signal 155 for the LUT 154 is determined as a function of prior values of the filtered acceleration both at the present position within the cycle of operation as well as adjacent positions within the cycle of operation. The principle behind the cyclical disturbance filter 170 of equation 2 is that the estimated acceleration value should not vary significantly over small changes in the cycle of operation. Thus, if the load observer 110 determines a new estimated acceleration disturbance ($\hat{\alpha}$) signal 152 that varies substantially from prior values of the cyclical acceleration feedforward ($\alpha_{cyc}$) signal 155, the single outlier will not significantly impact the cyclical acceleration feedforward ($\alpha_{cyc}$) signal 155 stored in the LUT 154. Equation 2 provides a first weighting value, $w_1$, for the prior value stored in the LUT 154; a second weighting value, $w_2$, for the newly determined value of the estimated acceleration disturbance ($\hat{\alpha}$) signal 152 received from the load observer 110; and a third weighting value, $w_3$, for the prior estimated values of cyclical disturbance at sample instances immediately prior to and immediately following the current sample instance.

$$D(n,t) = \frac{\begin{bmatrix} D(n-1,t)\cdot w_1 + A(n)\cdot w_2 + \\ D(n-1,t-1)\cdot w_3 + D(n-1,t+1)\cdot w_3 \end{bmatrix}}{(w_1+w_2+2\cdot w_3)} \quad (2)$$

where:
D(n, t)=new value of estimated acceleration for look up table at present sample instance in cycle;
D(n−1, t)=prior value of estimated acceleration from look up table at present sample instance in cycle;
D(n−1, t−1)=prior value of estimated acceleration from look up table at prior sample instance in cycle;
d(n−1, t+1)=prior value of estimated acceleration from look up table at next sample instance in cycle;
A(n)=new estimated acceleration from load observer;
$w_1$=first weighting value;
$w_2$=second weighting value; and
$w_3$=third weighting value.

With reference to equation 2 above, the first weighting value, $w_1$, is similar to the weighting value, w, of equation 1. The first weighting value, $w_1$, is preferably set to a value greater than one. In this manner, the historical data has a greater influence on the new value to be stored in the look up table than a single estimated acceleration value received from the observer 110. The second weighting value, $w_2$, is determined as a function of the distance that an actual position within a cycle is from a discrete position stored in the look up table 154. As previously discussed, the control module 105 may execute at a frequency greater than resolution of the look up table. When the actual cycle position corresponds to a cycle increment 156 stored in the look up table 154, the second weighting value, $w_2$, is one. As the actual cycle position deviates from the cycle increment 156, the second weighting value, $w_2$, decreases. If the actual cycle position is directly between two increments of the look up table, the second weighting value, $w_2$, is one-half. Therefore, the second weighting value, $w_2$, will be a value between one-half and one (0.5-1). The third weighting value, $w_3$, may be set to a value between zero and one-half (0.0-0.5), where the third weighting value is disabled when set to zero. The third weighting value, $w_3$, allows the estimated disturbances determined for the adjacent sample instances have some weight, but less than the weighting for the prior and current values of the disturbance values at the present sample instance.

Figure 10:
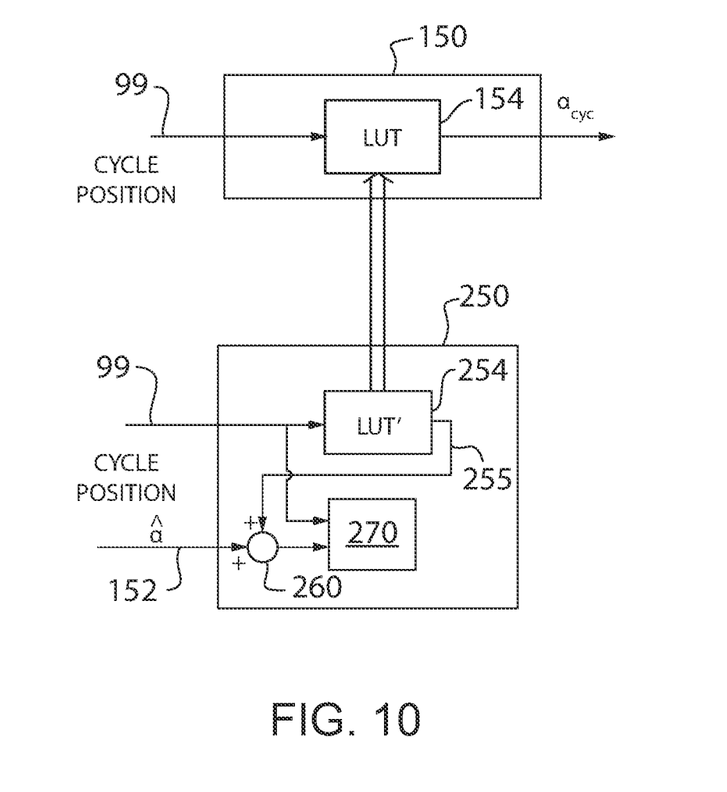
FIG. 10 is a block diagram representation of one embodiment of a cycle observer as implemented in part within a motor drive and in part within an external controller.

With reference next to FIG. 10, a cyclical disturbance filter routine 270 may also execute on an external controller 250. The external controller 250 is illustrated generally. However, with respect to the industrial control system 10 presented in FIG. 1, the external controller 250 may be the industrial controller 12 or an external computing device, such as the configuration computer 40 shown in FIG. 1. The motor drive 30 communicates the estimated acceleration ($\hat{\alpha}$) signal 152 determined by the load observer 110 back to the external controller 250 at each update interval of the motor drive 30. The external controller 250 is able to process the data at a slower update rate and periodically transmit data for the LUT 154 back to the motor drive 30.

If the external controller 250 is the industrial controller 12, the cycle position value 99 will typically be generated by and is available within the industrial controller 12. The estimated acceleration disturbance ($\hat{\alpha}$) signal 152 is received via the industrial control network 28 from the motor drive 30. The external controller 250 maintains a copy of the look up table, illustrated as LUT' 254. Similar to the cyclical disturbance filter routine 170 described above and executing on the motor drive 30, the cyclical disturbance filter routine 270 executing on the external controller 250 is used to update the estimated disturbance observed by the motor over one cycle of operation. The cyclical acceleration feedforward ($\alpha_{cyc}$) signal 255 previously stored in the LUT' 254 is added to a new estimated acceleration disturbance ($\hat{\alpha}$) 152 determined by the load observer 110 at a summing junction 260. This sum as well as the cycle position signal 99 are provided as inputs to the cyclical disturbance filter routine 270. The cyclical disturbance filter routine 270 may similarly take a number of different forms, where equations 1 and 2 above are two exemplary forms.

The copy of the look up table may be updated more frequently than the LUT 154 on the motor drive. For example, the external controller 250 may execute the cyclical disturbance filter routine 270 for each sample instance in one cycle of operation, determining new values for each sample instance in the LUT' 254. After determining new values over a complete cycle, the external controller 250 may transmit a copy of the entire LUT' 254 to the motor drive 30. The motor drive, in turn, updates its own LUT 154 with the copy of the look up table received from the external controller. In some applications, it may be sufficient to update the LUT 154 in the motor drive every fifth or every tenth cycle of operation.

According to another aspect of the invention, the external controller 250 may be configured to monitor changes in value of the estimated disturbance over time. An initial set of values for the LUT' 254 may be stored as a reference table. The LUT' 254 may be updated continuously. After each cycle of operation, the external controller 250 may compare the new values in the LUT' 254 to the values in the reference table. If a difference between any of the new values in the LUT' 254 and the values at the corresponding sample instance in the reference table exceeds a predefined value, the external controller transmits the LUT' 254 to the motor drive 30 to update the LUT 154 in use on the motor drive. In this manner processing overhead on the motor drive 30 may be reduced and communication bandwidth on the industrial network 28 is also kept to a minimum by only transmitting new values for the LUT 154 as changes in the estimated disturbance necessitate.

According to still another aspect of the invention, the external controller 250 may be configured to provide notification of changes in values of the estimated disturbance over time or between similar stations. A first threshold may be set by which the LUT' 254 is transmitted from the external controller 250 to the motor drive 30 as previously indicated. A second threshold may be set to indicate that the change over time exceeds a maximum threshold. This maximum threshold may correspond to a predefined level of wear such that maintenance is required in the controlled machine or process 36. Optionally, the maximum threshold may indicate a safe operating level has been exceeded, whether from normal maintenance requirements or due to failure of a component. The controlled machine or process 36 may include multiple stations performing identical functions. For example, a bottling process may simultaneously affix labels to six bottles and then insert the bottles into a bottle carrier. Each of the six stations should be identical in construction and operation. The external controller 250 may compare values in a LUT' 254 as stored in the external controller for each of the labelling stations. If the values for one of the LUTs' 254 deviates from another LUT' 254 by a predefined amount, an error is detected and the external controller 250 can generate a message identifying the faulty station.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for dynamic observation of a cyclic disturbance in a controlled machine or process, the method comprising the steps of:
   receiving a command signal at a motor drive, wherein the command signal corresponds to a desired operation of a motor operatively controlled by the motor drive;
   receiving a cycle position signal at the motor drive, wherein the cycle position signal corresponds to a location within one cycle of operation of the controlled machine or process and wherein the cycle of operation does not correspond to one rotation of the motor;
   determining a value of an estimated acceleration resulting from a disturbance force experienced by the motor during the cycle of operation; and
   storing the value of the estimated acceleration in memory of the motor drive at a plurality of sample instances within the cycle of operation.

2. The method of claim 1, wherein the step of determining the value of the estimated acceleration resulting from the disturbance force experienced by the motor drive is performed in the motor drive.

3. The method of claim 1, further comprising the steps of:
   transmitting the estimated acceleration to an external controller; and
   receiving a filtered value of the estimated acceleration from the external controller, wherein, the step of storing the value of the estimated acceleration in memory includes storing the filtered value of the estimated acceleration received from the external controller in memory of the motor drive.

4. The method of claim 1, further comprising the steps of:
   reading the value of the estimated acceleration that corresponds to the cycle position signal from the memory; and
   adding the value of the estimated acceleration that corresponds to the cycle position signal to a control routine executing in the motor drive to reduce a tracking error in the control routine.

5. The method of claim 1, wherein the step of determining the value of the estimated acceleration resulting from the disturbance force experienced by the motor during the cycle of operation further comprises the steps of:
   receiving a position feedback signal at the motor drive, the position feedback signal corresponding to an angular position of the motor; and
   determining a new estimated value of either an acceleration or a torque at the motor as a function of the position feedback signal with a load observer executing in the motor drive, wherein:
   the new estimated value of either the acceleration or the torque is determined for each of the plurality of sample instances during the cycle of operation, and
   the value of the estimated acceleration stored in memory corresponds to the new estimated value of either the acceleration or the torque.

6. The method of claim 5 further comprising the steps of:
   determining a current sample instance within the cycle of operation as a function of the cycle position signal; and
   reading a prior value of the estimated acceleration for the current sample instance, wherein the estimated acceleration is determined as a function of the new estimated value and the prior value.

7. The method of claim 6 wherein the estimated acceleration is determined as a weighted average of the new estimated value and the prior value.

8. The method of claim 6 further comprising the steps of:
   reading a present value of the cycle position signal in the motor drive;
   reading the prior value of the estimated acceleration for the present value of the cycle position signal from the memory of the motor drive; and
   reading the prior value of the estimated acceleration for at least one additional value of the cycle position signal from the memory of the motor drive, wherein a filtered value of the estimated acceleration is determined as a weighted average of the new estimated value, the prior value of the estimated acceleration at the present value of the cycle position signal, and the prior value of the estimated acceleration for the at least one additional value of the cycle position signal.

9. A motor drive configured to dynamically observe a cyclic disturbance in a controlled machine or process, the motor drive comprising:
   at least one input configured to receive a command signal and a cycle position signal, wherein the command signal corresponds to a desired operation of a motor operatively connected to the motor drive and the cycle position signal corresponds to a location within one cycle of operation of the controlled machine or process;
   a memory configured to store a look up table; and
   a processor configured to:
      determine a value of an estimated acceleration resulting from a disturbance force experienced by the motor during the cycle of operation, and
      store the value of the estimated acceleration in the look up table at a plurality of sample instances within the cycle of operation.

10. The motor drive of claim 9, wherein the processor is further configured to:
    transmit the value of the estimated acceleration to an external controller, and
    receive a filtered value of the estimated acceleration from the external controller, wherein the value of the estimated acceleration stored in the look up table is the filtered value received from the external controller.

11. The motor drive of claim 9, wherein the processor is further configured to execute a control routine to obtain the desired operation of the motor, wherein the value of the estimated acceleration that corresponds to the cycle position signal is added to the control routine to reduce a tracking error in the control routine.

12. The motor drive of claim 9, further comprising:
    at least one additional input configured to receive a position feedback signal corresponding to an angular position of the motor, wherein the processor is further configured to:
    execute a load observer to determine a new estimated value of either an acceleration or a torque at the motor as a function of the position feedback signal, and
    determine the new estimated value of either the acceleration or the torque for each of the plurality of sample instances during the cycle of operation, wherein the estimated acceleration stored in the look up table corresponds to the new estimated value of either the acceleration or the torque.

13. The motor drive of claim 12, wherein the processor is further configured to:
    determine a current sample instance from the plurality of sample instances as a function of the cycle position signal,
    read a prior value of the estimated acceleration for the current sample instance from the look up table, and determine a filtered value of the estimated acceleration to be stored in the look up table as a function of the new estimated value and the prior value.

14. The motor drive of claim 13, wherein the processor is further configured to determine a weighted average of the new estimated value and the prior value.

15. The motor drive of claim 13, wherein the processor is further configured to:
- read a present value of the cycle position signal;
- read the prior value of the estimated acceleration for the present value of the cycle position signal from the look up table; and
- read the prior value of the estimated acceleration for at least one additional value of the cycle position signal from the look up table, wherein a filtered value of the estimated acceleration is determined as a weighted average of the new estimated value, the prior value of the estimated acceleration at the present value of the cycle position signal, and the prior value of the estimated acceleration for the at least one additional value of the cycle position signal.

16. A method for dynamic compensation of a cyclic disturbance in a controlled machine or process, the method comprising the steps of:
- receiving a command signal at a motor drive, wherein the command signal corresponds to a desired operation of a motor operatively controlled by the motor drive;
- receiving a cycle position signal at the motor drive, wherein the cycle position signal corresponds to a location within one cycle of operation of the controlled machine or process and wherein the cycle of operation does not correspond to one rotation of the motor;
- reading a disturbance value from a look up table stored in a memory of the motor drive, wherein the disturbance value corresponds to the cycle position signal; and
- executing a control module within the motor drive responsive to receiving the command signal to obtain the desired operation of the motor, wherein the disturbance value is provided to the control module to reduce a tracking error in the control module.

17. The method of claim 16 further comprising the steps of:
- receiving a position feedback signal at the motor drive, the position feedback signal corresponding to an angular position of the motor; and
- determining a new estimated value of either an acceleration or a torque with a load observer in the motor drive as a function of the position feedback signal, wherein:
  - the disturbance value read from the look up table is determined as a function of a prior estimated value of either the acceleration or the torque determined for the corresponding location within the cycle of operation indicated by the cycle position signal.

18. The method of claim 17, further comprising a step of updating the look up table as a function of the new estimated value of either the acceleration or the torque.

19. The method of claim 18 further comprising the steps of:
- determining a new value for the look up table in the motor drive at each value of the cycle position signal, wherein the new value is a function of the new estimated value and of the disturbance value read from the look up table; and
- overwriting the disturbance value read from the look up table with the new value for the look up table.

20. The method of claim 17, further comprising the steps of:
- transmitting the new estimated value of either the acceleration or the torque to an external controller;
- determining a new value for the look up table in the external controller at each value of the cycle position signal;
- periodically transmitting the new values for the look up table to the motor drive; and
- overwriting the look up table in the motor drive with the new values received from the external controller.

* * * * *